(12) United States Patent
Funk et al.

(10) Patent No.: US 8,893,482 B2
(45) Date of Patent: Nov. 25, 2014

(54) SYSTEM FOR DETERMINING SULFUR STORAGE OF AFTERTREATMENT DEVICES

(75) Inventors: Sarah Funk, Canton, MI (US); Rebecca J. Darr, Milford, MI (US); Paul Jasinkiewicz, Northville, MI (US); Amr Radwan, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 192 days.

(21) Appl. No.: 13/423,617

(22) Filed: Mar. 19, 2012

(65) Prior Publication Data

US 2013/0239553 A1 Sep. 19, 2013

(51) Int. Cl.
*F01N 3/00* (2006.01)

(52) U.S. Cl.
USPC ............... 60/297; 60/276; 60/277; 60/295; 60/301

(58) Field of Classification Search
USPC ............... 60/276, 277, 285, 295, 297, 301
See application file for complete search history.

(56) References Cited

U.S. PATENT DOCUMENTS

| | | | |
|---|---|---|---|
| 6,684,627 B2 * | 2/2004 | Mizuno et al. | 60/274 |
| 7,707,826 B2 * | 5/2010 | Wang et al. | 60/295 |
| 7,769,533 B2 * | 8/2010 | Audouin et al. | 701/108 |
| 7,997,068 B2 * | 8/2011 | Morita et al. | 60/286 |
| 8,297,042 B2 * | 10/2012 | Asanuma et al. | 60/285 |
| 8,307,639 B2 * | 11/2012 | Nishioka et al. | 60/301 |
| 8,322,131 B2 * | 12/2012 | Yamamoto | 60/286 |
| 2008/0104946 A1 | 5/2008 | Wang et al. | |
| 2009/0025369 A1 | 1/2009 | Yoshida et al. | |
| 2009/0171553 A1 | 7/2009 | Audouin et al. | |
| 2010/0287913 A1 | 11/2010 | Yamamoto | |

FOREIGN PATENT DOCUMENTS

| | | |
|---|---|---|
| DE | 10038461 A1 | 3/2002 |
| DE | 60002804 T2 | 3/2004 |

OTHER PUBLICATIONS

German Office Action for Application No. 102013203602.7 dated Apr. 29, 2014; 7 pages.

* cited by examiner

Primary Examiner — Binh Q Tran
(74) Attorney, Agent, or Firm — Cantor Colburn LLP

(57) ABSTRACT

An exhaust gas treatment system for an internal combustion engine for determining a total amount of sulfur that is stored on at least one aftertreatment device is provided. The exhaust gas treatment system includes a control module that monitors operation of the internal combustion engine for an amount of fuel consumed and an amount of oil consumed by the internal combustion engine. The control module includes a sulfur adsorption module and a total sulfur storage module. The sulfur adsorption module determines a rate of sulfur adsorption in at least one aftertreatment device. The rate of sulfur adsorption is based on the amount of fuel consumed and the amount of oil consumed. The total sulfur storage module is in communication with the sulfur adsorption module. The total sulfur storage module determines the total amount of sulfur stored based on the rate of sulfur adsorption.

20 Claims, 3 Drawing Sheets

SYSTEM FOR DETERMINING SULFUR STORAGE OF AFTERTREATMENT DEVICES

FIELD OF THE INVENTION

Exemplary embodiments of the present invention relate to exhaust gas treatment systems for internal combustion engines and, more particularly, to an exhaust gas treatment system for determining an amount of sulfur stored on at least one aftertreatment device.

BACKGROUND

The exhaust gas emitted from an internal combustion engine, particularly a diesel engine, is a heterogeneous mixture that contains gaseous emissions such as, but not limited to, carbon monoxide ("CO"), unburned hydrocarbons ("HC") and oxides of nitrogen ("$NO_x$") as well as condensed phase materials (liquids and solids) that constitute particulate matter ("PM"). Catalyst compositions, typically disposed on catalyst supports or substrates, are provided in an engine exhaust system to convert certain, or all of these exhaust constituents into non-regulated exhaust gas components.

One type of exhaust treatment technology for reducing CO and HC emissions is an oxidation catalyst device ("OC"). The OC device includes a flow-through substrate and a catalyst compound applied to the substrate. One type of exhaust treatment technology for reducing $NO_x$ emissions is a selective catalytic reduction ("SCR") device that may be positioned downstream of the OC device. The SCR device includes a substrate, having a SCR catalyst compound applied to the substrate.

During operation of the engine, the components of the aftertreatment system are exposed to sulfur from the fuel as well as the engine oil that are consumed by the engine. The sulfur will accumulate on a catalyst wash coat of the OC device as well as a catalyst wash coat of the SCR device. The sulfur is released from the catalysts of the OC device and the SCR device at relatively high temperatures (e.g., typically about 500° C. or greater). Specifically, a desulfurization cycle or mode may be initiated by an engine control module once the amount of adsorbed sulfur reaches a specific threshold value. However, the sulfur may still accumulate on the OC device and the SCR device. Over time as the sulfur accumulates, this affects the performance of the SCR catalyst as well as the OC catalyst. However, it should be noted that this performance degradation may be reversed during the desulfurization cycle, where the sulfur is released from the OC device and the SCR device. Accordingly, it is desirable to provide an approach for determining the amount of sulfur that is stored on various exhaust gas aftertreatment devices.

SUMMARY OF THE INVENTION

In one exemplary embodiment of the invention, an exhaust gas treatment system for an internal combustion engine for determining a total amount of sulfur that is stored on at least one aftertreatment device is provided. The exhaust gas treatment system includes a control module that monitors operation of the internal combustion engine for an amount of fuel consumed and an amount of oil consumed by the internal combustion engine. The control module includes a sulfur adsorption module and a total sulfur storage module. The sulfur adsorption module determines a rate of sulfur adsorption in the at least one aftertreatment device. The rate of sulfur adsorption is based on the amount of fuel consumed and the amount of oil consumed. The total sulfur storage module is in communication with the sulfur adsorption module. The total sulfur storage module determines the total amount of sulfur based on the rate of sulfur adsorption.

In another embodiment, a sulfur desorption module that calculates a rate of sulfur desorption by the at least one aftertreatment device is included. The total sulfur storage module determines the total amount of sulfur stored based on the rate of sulfur adsorption and the rate of sulfur desorption.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
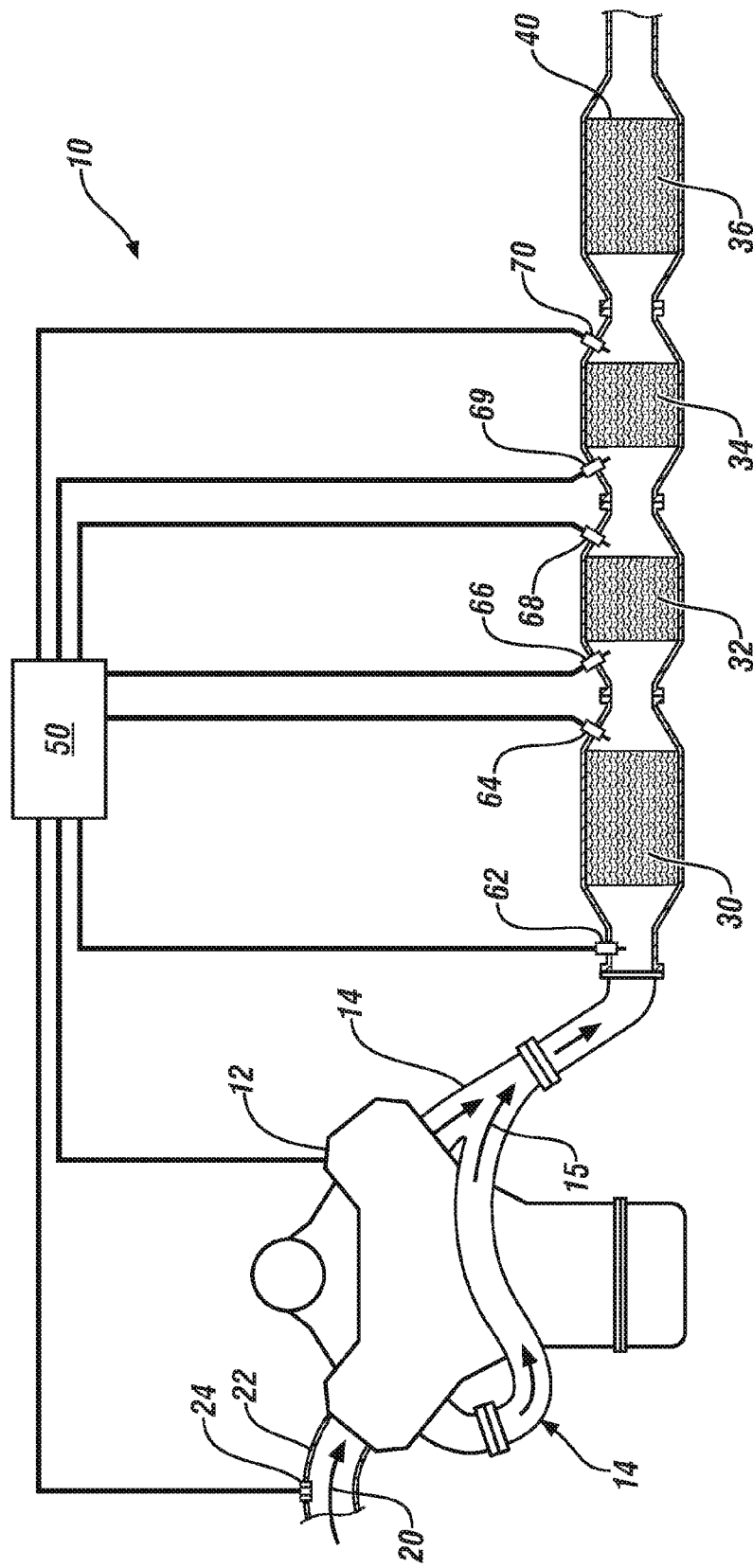
FIG. 1 is a schematic diagram of an exemplary exhaust gas treatment system.

Referring now to FIG. 1, an exemplary embodiment is directed to an exhaust gas treatment system 10 for an internal combustion (IC) engine 12. The engine 12 is configured to receive an intake air 20 from an air intake passage 22. The intake air passage 22 includes an intake mass air flow sensor 24 for determining the intake air mass of the engine 12. In one embodiment, the intake mass air flow sensor 24 may be either a vane meter or a hot wire type intake mass air flow sensor, however, it is to be understood that other types of sensors may be used as well. An exhaust gas conduit 14, which may comprise several segments, transports exhaust gas 15 from the IC engine 12 to the various exhaust treatment devices of the exhaust gas treatment system 10.

The exhaust gas treatment system 10 described herein can be implemented in various engine systems that may include, but are not limited to, diesel engine systems, gasoline engine systems, and homogeneous charge compression ignition engine systems. In the exemplary embodiment as illustrated, the exhaust gas treatment system devices include a first oxidation catalyst device ("OC") 30, a selective catalytic reduction device ("SCR") 32, a second OC device 34, and a particulate filter device ("PF") 36. As can be appreciated, the exhaust gas treatment system of the present disclosure may include various combinations of one or more of the exhaust treatment devices shown in FIG. 1, and/or other exhaust treatment devices (e.g., lean $NO_x$ traps), and is not limited to the present example.

The first OC device 30 and the second OC device 34 may both include, for example, a flow-through metal or ceramic monolith substrate that is packaged in a stainless steel shell or canister having an inlet and an outlet in fluid communication with exhaust gas conduit 14. The substrate can include an oxidation catalyst compound disposed thereon. The oxidation catalyst compound may be applied as a wash coat and may contain platinum group metals such as platinum ("Pt"), palladium ("Pd"), rhodium ("Rh") or other suitable oxidizing catalysts, or combinations thereof. The OC devices 30 and 34 are useful in treating unburned gaseous and non-volatile HC and CO, which are oxidized to form carbon dioxide and water.

The SCR device 32 may be disposed downstream of the first OC device 30 and upstream of the second OC device 34. In a manner similar to the OC devices 30 and 34, the SCR device 32 may include, for example, a flow-through ceramic or metal monolith substrate that may be packaged in a stainless steel shell or canister having an inlet and an outlet in fluid communication with the exhaust gas conduit 14. The substrate may include an SCR catalyst composition applied thereto. The SCR catalyst composition may contain a zeolite and one or more base metal components such as iron ("Fe"), cobalt ("Co"), copper ("Cu") or vanadium ("V") which can operate efficiently to convert $NO_x$ constituents in the exhaust gas 15 in the presence of a reductant such as ammonia.

The PF device 36 may be disposed downstream of the SCR device 32 and the second OC device 34. The PF device 36 operates to filter the exhaust gas 15 of carbon and other particulates. In various embodiments, the PF device 36 may be constructed using a ceramic wall flow monolith filter 40 that may be packaged in a shell or canister constructed of, for example, stainless steel, and that has an inlet and an outlet in fluid communication with exhaust gas conduit 14. The ceramic wall flow monolith filter 40 may have a plurality of longitudinally extending passages that are defined by longitudinally extending walls. The passages include a subset of inlet passages that have an open inlet end and a closed outlet end, and a subset of outlet passages that have a closed inlet end and an open outlet end. Exhaust gas 15 entering the filter 40 through the inlet ends of the inlet passages is forced to migrate through adjacent longitudinally extending walls to the outlet passages. It is through this wall flow mechanism that the exhaust gas 15 is filtered of carbon and other particulates. The filtered particulates are deposited on the longitudinally extending walls of the inlet passages and, over time, will have the effect of increasing the exhaust gas backpressure experienced by the IC engine 12. It is appreciated that the ceramic wall flow monolith filter is merely exemplary in nature and that the PF 36 may include other filter devices such as wound or packed fiber filters, open cell foams, sintered metal fibers, etc. The increase in exhaust backpressure caused by the accumulation of particulate matter in the monolith filter 40 typically requires that the PF device 36 is periodically cleaned, or regenerated. Regeneration involves the oxidation or burning of the accumulated carbon and other particulates in what is typically a high temperature environment (>600° C.).

A control module 50 is operably connected to and monitors the engine 12 and the exhaust gas treatment system 10 through a number of sensors. FIG. 1 illustrates the control module 50 in communication with the engine 12, the intake mass air flow sensor 24, first and second temperature sensors 62 and 64 for determining the temperature profile of the first OC device 30, third and fourth temperature sensors 66 and 68 for determining the temperature profile of the SCR device 32, and fifth and sixth temperature sensors 69 and 70 for determining the temperature profile of the second OC device 34.

The control module 50 determines an amount of sulfur that is stored on at least one aftertreatment device (e.g., the first OC device 30, the SCR device 32, and the second OC device 34) since a previous or last desulfurization cycle. The desulfurization cycle may be initiated by the control module 50 once the amount of sulfur adsorbed on the aftertreatment devices reaches a threshold level. During the desulfurization cycle, the first OC device 30, the SCR device 32, and the second OC device 34 are subjected to elevated temperatures (generally above about 500° C.) to release sulfur stored on the catalyst. In the exemplary embodiment as shown, the control module 50 includes control logic for determining the amount of sulfur that is stored on the first OC device 30, the SCR device 32, and the second OC device 34. However, it is to be understood that various combinations of aftertreatment devices (e.g., OC devices and/or SCR devices) may be used as well depending on the configuration of the exhaust gas treatment system 10.

In one embodiment, the control module 50 may include a calibratable switch (not illustrated), which activates the control logic for determining the amount of sulfur storage on the first OC device 30, the SCR device 32, and the second OC device 34. That is, the calibratable switch may be activated or deactivated depending on the specific layout and configuration of the exhaust gas treatment system 10, as well as various operating parameters of the engine 12. For example, the calibratable switch may be deactivated for the entire exhaust gas treatment system if the aftertreatment devices (e.g., the OC devices and the SCR devices) are located proximate to the PF device such that the aftertreatment devices are generally subjected to the elevated temperatures created during regeneration of the PF device. This is because most or substantially all of the sulfur stored in all of the aftertreatment devices (e.g., the OC device and the SCR device) is released regeneration of the PF device. As a result, determining the amount of sulfur stored on the aftertreatment devices may not be necessary.

In one embodiment, the control module 50 includes control logic for calculating an exhaust mass flow located within the exhaust gas conduit 14. The exhaust mass flow is based on the intake air mass of the engine 12, which is measured by the intake air mass airflow sensor 24 as well as a fuel mass flow of the engine 12. Specifically, the exhaust mass flow is calculated by adding the intake air mass of the engine 12 and the fuel mass flow of the engine 12. The fuel mass flow is measured by summing the total amount of fuel injected into the engine 12 over a given period of time (e.g., since the last desulfurization cycle). The fuel mass flow is added to the air mass flow rate to calculate the exhaust mass flow of the engine 12.

Figure 2:
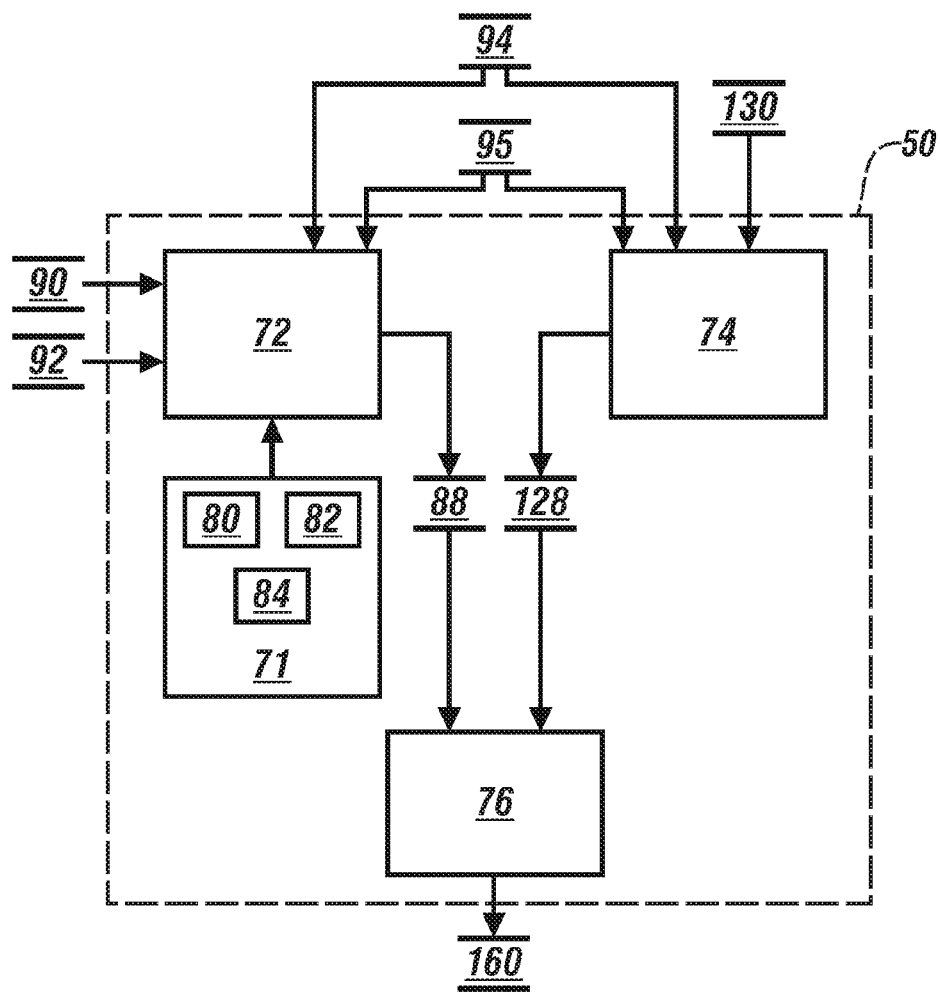
FIG. 2 is a dataflow diagram of a control module shown in FIG. 1.

FIG. 2 is an illustration of a dataflow diagram that illustrates various elements that may be embedded within the control module 50. Various embodiments of the exhaust gas treatment system 10 (FIG. 1) according to the present disclosure may include any number of sub-modules embedded within the control module 50. As can be appreciated, the sub-modules shown in FIG. 2 may be combined or further partitioned as well. Inputs to the control module 50 may be sensed from the exhaust gas treatment system 10, received from other control modules (not shown), or determined by other sub-modules or modules. In the embodiment as shown in FIG. 2, the control module 50 includes a memory 71, a sulfur adsorption module 72, a sulfur desorption module 74, and a total sulfur storage module 76.

In one embodiment, the memory 71 of the control module 50 stores a number of variables that are used to determine the amount of sulfur adsorption on the first OC device 30, the SCR device 32, and the second OC device 34 (shown in FIG. 1). Specifically, the memory 71 stores a sulfur exposure from fuel value 80, a sulfur exposure from oil value 82, and a capture rate value 84. The sulfur exposure from fuel value 80 is a calibratable scalar value that is based on the nominal value of an amount of sulfur that is generally found in the fuel of the engine 12. The sulfur exposure from oil value 82 is also a calibratable scalar value that is based on the nominal value of the amount of sulfur that is generally found in the oil of the engine 12. The sulfur exposure from fuel value 80 and the sulfur exposure from oil value 82 may depend on specific regulations, and are expressed in units of mass concentration such as, for example, milligrams per liter. Although FIG. 2 illustrates the control module 50 having the memory 71, it is understood that the sulfur exposure from fuel value 80, the sulfur exposure from oil value 82, and the capture rate value 84 may be obtained from other control modules as well.

The capture rate value 84 is a value that represents an amount of sulfur that is actually transmitted to the exhaust gas conduit 14 (shown in FIG. 1). That is, the exhaust aftertreatment system 10 is exposed to a portion of the sulfur present in the fuel and oil that the engine 12 has consumed during operation, which is the capture rate value 84. In one embodiment, the capture rate 84 may be determined by testing of the catalyst wash coat of the first OC device 30, the SCR device 32, and the second OC device 34 (e.g., chemical analysis of the exhaust gas that enters and exits the first OC device 30 and the SCR device 32).

The sulfur adsorption module 72 determines a rate of sulfur adsorption 88 of the first OC device 30, the SCR device 32, and the second OC device 34 (shown in FIG. 1) during a sulfur adsorption cycle. Sulfur adsorption occurs any time during operation of the engine 12 when the aftertreatment devices are not releasing sulfur during a desulfurization cycle. The rate of sulfur adsorption may be expressed in units of mass/time (e.g., milligrams/second). The sulfur adsorption module 72 receives as inputs the sulfur exposure from fuel value 80, the sulfur exposure from oil value 82, and the capture rate value 84 from the memory 71.

The sulfur adsorption module 72 also receives a fuel consumption value 90, an oil consumption value 92, an exhaust temperature value 94, and a mass adsorbed value 95. The fuel consumption value 90 and the oil consumption value 92 are determined by monitoring operation of the engine 12 since the last desulfurization cycle. That is, the fuel consumption value 90 represents the cumulative sum of fuel consumed by the engine 12 since the last desulfurization cycle. Likewise, the oil consumption value 92 represents the cumulative sum of oil consumed by the engine 12 since the last desulfurization cycle. Both the fuel consumption value 90 and the oil consumption value 92 are reset after each desulfurization cycle.

Figure 3:
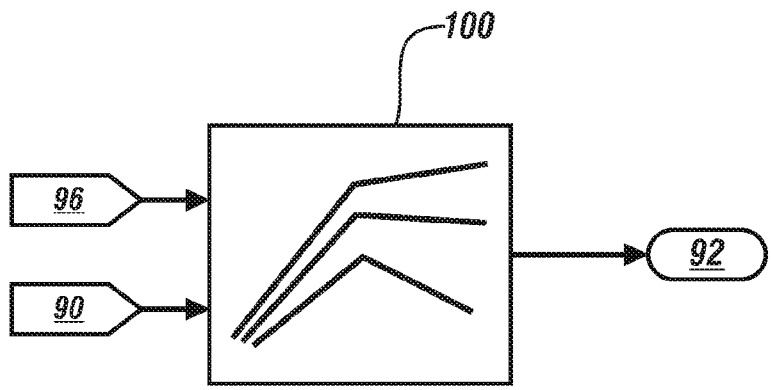
FIG. 3 is an exemplary approach for determining an oil consumption value shown in FIG. 2.

Turning to FIG. 3, one exemplary embodiment of determining the oil consumption value 92 is illustrated. In the embodiment as shown, the control module 50 includes control logic for monitoring the engine 12 (shown in FIG. 1) for an engine speed 96. The fuel consumption value 90 is inputted into an exemplary engine speed/load map 100 that is populated for determining oil consumption. For example, in one illustrative embodiment, at 1200 RPM engine speed and 30 mg/cycle of fuel, the oil consumption could be about 5 mg/s. The output of the engine speed/load map 100 may be integrated over time to determine the oil consumption value 92.

Referring back to FIG. 2, the exhaust temperature value 94 may include the temperature profiles of aftertreatment devices such as the first OC device 30, the SCR device 32, and the second OC device 34. Specifically, in one embodiment, the first and second temperature sensors 62, 64 (shown in FIG. 1) send electrical signals to the control module 50 that indicate the temperature profile of the OC device 30, the third and fourth temperature sensors 66, 68 (shown in FIG. 1) send electrical signals to the control module 50 that indicate the temperature profile of the SCR device 32, and the fifth and sixth temperature sensors 69, 70 send electrical signals to the control module that indicate the temperature profile of the second OC device 34. Alternatively, in another embodiment, the control module 50 may include control logic for determining the temperature profiles of the first OC device 30, the SCR device 32, and the second OC device 34 based on operating parameters of the engine 12 (shown in FIG. 1).

The mass adsorbed value 95 is a value calculated by the control module 50, and represents the amount of sulfur that is already adsorbed on the first OC device 30, the SCR device 32, and the second OC device 34 (shown in FIG. 1). The mass adsorbed value 95 is a time integrated value of the amount of sulfur adsorbed (e.g., for example at time=0 seconds, there is generally no sulfur adsorbed, but 10 g/s sulfur entering into the catalyst, at time=1 seconds, there are 10 g of sulfur now adsorbed by the catalyst). The sulfur exposure from the fuel value 80, the sulfur exposure from oil value 82, the capture rate value 84, the fuel consumption value 90, the oil consumption value 92, the exhaust temperature value 94, and the mass adsorbed value 95 are used to calculate the rate of sulfur adsorption 88.

Figure 4:
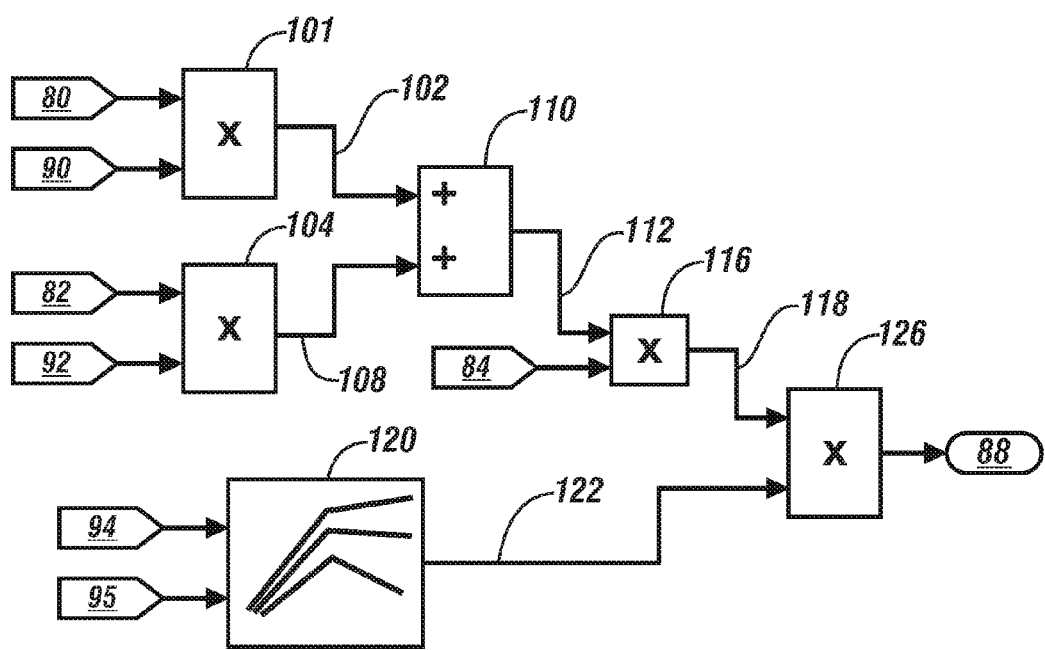
FIG. 4 is an exemplary approach for of calculating a rate of sulfur adsorption by a sulfur adsorption module of FIG. 2.

Turning now to FIG. 4, an exemplary approach of calculating the rate of sulfur adsorption 88 by the sulfur adsorption module 72 is illustrated. In the embodiment as shown, the sulfur exposure from the fuel value 80 and the fuel consumption value 90 are sent to a multiplier 101 to determine a value 102. The value 102 indicates the sulfur exposure with respect to fuel consumed, and may be expressed in units of mass/time (e.g., milligrams/second). The sulfur exposure from oil value 82 and the oil consumption value 92 are sent to a multiplier 104 to determine a value 108. The value 108 indicates the sulfur exposure with respect to oil consumed, and may also be expressed in units of mass/time (e.g., milligrams/second). Block 110 adds the values 102 and 108 together to determine a value 112. The value 112 indicates the sulfur exposure with respect to both fuel and oil consumed. The value 112 and the capture rate 84 (which is a unitless value) are both sent to a multiplier 116 to determine a value 118. The value 118 indicates the amount of sulfur captured by the aftertreatment devices (e.g., the first OC device 30, the SCR 32, and the second OC device 34 shown in FIG. 1) with respect to the amount of oil and fuel consumed.

The exhaust temperature value 94 and the mass adsorbed value 95 are both sent to an exemplary adsorption coefficient map 120. The adsorption coefficient map 120 outputs a coefficient of sulfur adsorption 122 of the first OC device 30, the SCR device 32, and the second OC device 34, and is a unitless value. The coefficient of sulfur adsorption 122 and the value 118 (which indicates the amount of sulfur captured by the aftertreatment devices) are sent to a multiplier 126. The product of the coefficient of sulfur adsorption 122 and the value 118 results in the rate of sulfur adsorption 88.

In one embodiment, the approach as described in FIG. 4 may be expressed by the following equation:

$$dmS_{adsorbed} = d([S]_{Fuel} * \text{FuelCons}_{deSOx} + [S]_{Oil} * \text{OilCons}_{deSOx}) * f_{CaptureRate} * qaf(temp, mS_{accumulated})_{adsorption}$$

where $dmS_{adsorbed}$ is the rate of sulfur adsorption 88, $[S]_{Fuel}$ is the sulfur exposure from the fuel value 80, $\text{FuelCons}_{deSOx}$ is the fuel consumption value 90, $[S]_{Oil}$ is the sulfur exposure from oil value 82, $\text{OilCons}_{deSOx}$ is the oil consumption value 92, $f_{CaptureRate}$ is the capture rate value 84, and $f(temp, mS_{accumulated})_{adsorption}$ is the coefficient of sulfur adsorption 122.

Referring back to FIG. 2, the sulfur desorption module 74 determines a rate of sulfur desorption 128 by the aftertreatment devices (e.g., the first OC device 30, the SCR device 32, and the second OC device 34) when exposed to elevated temperatures (generally over about 500° C.). In the embodiment as shown, the inputs into the sulfur desorption module 74 include an exhaust mass flow 130, the exhaust temperature value 94, and the mass adsorbed value 95. The exhaust mass flow 130 is based on the intake air mass of the engine 12 (measured by the intake air mass airflow sensor 24 shown in FIG. 1) and the fuel mass flow of the engine 12. Alternatively, the input 130 into the sulfur desorption module 74 may be the exhaust gas space velocity, which is measured in units of inverse time (e.g., generally 1/hour). The exhaust gas space velocity is the volumetric flow rate of the exhaust gas 15 divided by the volume of the catalyst.

Figure 5:
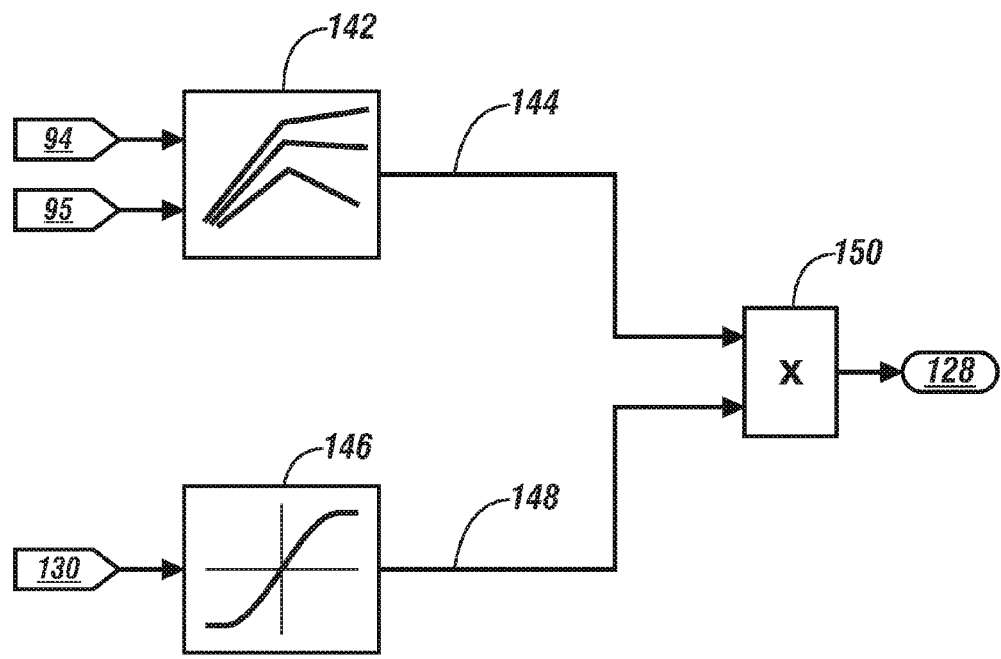
FIG. 5 is an exemplary approach of calculating a rate of sulfur released by a sulfur desorption module of FIG. 2.

FIG. 5 is an exemplary approach of calculating the rate of sulfur desorption 128 by the sulfur desorption module 74 is illustrated. In the embodiment as shown, the exhaust temperature value 94, and the mass adsorbed value 95 are sent to a sulfur desorption map 142 to determine a rate of desorption value 144, which is expressed in units of mass/time (e.g., milligrams/second). The exhaust mass flow 130 is sent to a mass flow correction factor table 146 to determine a mass flow correction coefficient 148, which is unitless. The rate of desorption value 144 and the mass flow correction coefficient 148 are sent to a multiplier 150. The product of the rate of desorption value 144 and the mass flow correction value 148 is the rate of sulfur desorption 128.

In one embodiment, the approach as described in FIG. 4 may be expressed by the following equation:

$$dmS_{desorbed} = f(temp, mS_{accumulated}, SV)_{desorption}$$

where $dmS_{desorbed}$ is the rate of sulfur desorption 128, temp is the exhaust temperature value 94, $mS_{accumulated}$ is the mass adsorbed value 95, and $f_{desorption}$ mass flow correction coefficient 148.

Referring back to FIG. 2, the rate of sulfur adsorption 88 and the rate of sulfur desorption 128 are sent to the total sulfur storage module 76. The total sulfur storage module 76 determines a total amount of sulfur 160 that is stored on the aftertreatment devices (e.g., the first OC device 30, the SCR device 30, and the second OC device 34 illustrated in FIG. 1). The total amount of sulfur 160 may be calculated using the following equation:

$$dmS_{stored} = dmS_{adsorbed} - dmS_{desorbed}$$

where $dmS_{adsorbed}$ is the rate of sulfur adsorption 88, $dmS_{desorbed}$ is the rate of sulfur desorption 128, and $dmS_{stored}$ is the total amount of sulfur stored 160.

Referring generally to FIGS. 1-5, the total amount of sulfur stored 160 will indicate the total amount of sulfur that is stored on various aftertreatment devices of the exhaust gas treatment system 10 with respect to the sulfur exposure due to fuel consumption and oil consumption of the engine 12. Moreover, the total amount of sulfur stored 160 also takes into account the rate of sulfur desorption 128 by the aftertreatment devices when exposed to elevated temperatures (generally over 500° C.). The ability to calculate the total amount of sulfur 160 stored on the aftertreatment devices allows for appropriate actions to maintain performance of the exhaust gas aftertreatment system. This in turn may result in improved emissions and enhanced performance of the exhaust gas treatment system 10.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust gas treatment system for an internal combustion engine that determines a total amount of sulfur stored on at least one aftertreatment device, comprising:
   a control module monitoring operation of the internal combustion engine for an amount of fuel consumed and an amount of oil consumed by the internal combustion engine, wherein the amount of oil consumed is based on an engine speed, the control module comprising:
   a sulfur adsorption module determining a rate of sulfur adsorption in the at least one aftertreatment device, wherein the rate of sulfur adsorption is based on an exhaust temperature value, the amount of fuel consumed and the amount of oil consumed; and
   a total sulfur storage module in communication with the sulfur adsorption module, the total sulfur storage module determining the total amount of sulfur stored based on the rate of sulfur adsorption.

2. The exhaust gas treatment system as recited in claim 1, wherein a sulfur exposure from fuel value and a sulfur exposure from oil value are inputs to the sulfur adsorption module, and wherein the sulfur exposure from fuel value and the sulfur exposure from oil value are used to calculate the rate of sulfur adsorption.

3. The exhaust gas treatment system as recited in claim 1, wherein the sulfur adsorption module receives the exhaust temperature value that represents a temperature profile of the at least one aftertreatment device.

4. The exhaust gas treatment system as recited in claim 3, wherein the sulfur adsorption module receives a mass adsorbed value that represents a previous amount of sulfur that is already adsorbed by the at least one aftertreatment device, and wherein the rate of sulfur adsorption is based on the mass adsorbed value.

5. The exhaust gas treatment system as recited in claim 4, wherein the sulfur adsorption module receives a capture rate value that represents a captured amount of sulfur that is transmitted to the at least one aftertreatment device from the amount of fuel consumed and the amount of oil consumed, and wherein the rate of sulfur adsorption is based on the capture rate value.

6. The exhaust gas treatment system as recited in claim 5, wherein the rate of sulfur adsorption is determined by the following equation:

$$dmS_{adsorbed} = d([S]_{Fuel} * FuelCons_{deSOx} + [S]_{Oil} * OilCons_{deSOx}) * f_{CaptureRate} * f(temp, mS_{accumulated})_{adsorption}$$

where $dmS_{adsorbed}$ is the rate of sulfur adsorption, $[S]_{Fuel}$ is the sulfur exposure from fuel value, $FuelCons_{deSOx}$ is the amount of fuel consumed, $[S]_{Oil}$ is the sulfur exposure from oil value, $OilCons_{deSOx}$ is the amount of oil consumed, $f_{CaptureRate}$ is the capture rate value, and $f(temp, mS_{accumulated})_{adsorption}$ is a coefficient of sulfur adsorption that is based on the exhaust temperature value temp and the mass adsorbed value $mS_{accumulated}$.

7. The exhaust gas treatment system as recited in claim 1, comprising a sulfur desorption module that calculates a rate of sulfur desorption by the at least one aftertreatment device, wherein the total sulfur storage module determines the total amount of sulfur stored based on the rate of sulfur adsorption and the rate of sulfur desorption.

8. The exhaust gas treatment system as recited in claim 7, wherein the total amount of sulfur stored is determined by the following equation:

$$dmS_{stored}=dmS_{adsorbed}-dmS_{desorbed}$$

where $dmS_{adsorbed}$ is the rate of sulfur adsorption, $dmS_{desorbed}$ is the rate of sulfur desorption, and $dmS_{stored}$ is the total amount of sulfur stored.

9. The exhaust gas treatment system as recited in claim 7, wherein the rate of sulfur desorption by the at least one aftertreatment device is based on the exhaust temperature value and a mass adsorbed value, wherein the exhaust temperature value represents a temperature profile of the at least one aftertreatment device and the mass adsorbed value represents a previous amount of sulfur that is already adsorbed by the at least one aftertreatment device.

10. The exhaust gas treatment system as recited in claim 7, wherein the rate of sulfur desorption by the at least one aftertreatment device is based on one of an exhaust mass flow of the internal combustion engine and an exhaust gas space velocity value.

11. The exhaust gas treatment system as recited in claim 1, wherein the at least one aftertreatment device is at least one of an oxidation catalyst device ("OC") and a selective catalytic reduction device ("SCR").

12. An exhaust gas treatment system for an internal combustion engine that determines a total amount of sulfur stored on at least one aftertreatment device, comprising:
a control module monitoring operation of the internal combustion engine for an amount of fuel consumed and an amount of oil consumed by the internal combustion engine, the control module comprising:
a sulfur adsorption module determining a rate of sulfur adsorption in the at least one aftertreatment device, the sulfur adsorption module receiving a sulfur exposure from fuel value and a sulfur exposure from oil value as inputs, wherein the rate of sulfur adsorption is based on the amount of fuel consumed, the amount of oil consumed, the sulfur exposure from fuel value, and the sulfur exposure from oil value;
a sulfur desorption module that calculates a rate of sulfur desorption by the at least one aftertreatment device based on an exhaust temperature value and one of an exhaust mass flow of the internal combustion engine and an exhaust gas space velocity value; and
a total sulfur storage module in communication with the sulfur adsorption module and the sulfur desorption module, the total sulfur storage module determining the total amount of sulfur stored based on the rate of sulfur adsorption and the rate of sulfur desorption.

13. The exhaust gas treatment system as recited in claim 12, wherein the sulfur adsorption module receives the exhaust temperature value that represents a temperature profile of the at least one aftertreatment device, and wherein the rate of sulfur adsorption is further based on the exhaust temperature value.

14. The exhaust gas treatment system as recited in claim 13, wherein the sulfur adsorption module receives a mass adsorbed value that represents a previous amount of sulfur that is already adsorbed by the at least one aftertreatment device, and wherein the rate of sulfur adsorption is based on the mass adsorbed value.

15. The exhaust gas treatment system as recited in claim 14, wherein the sulfur adsorption module receives a capture rate value that represents a captured amount of sulfur that is transmitted to the at least one aftertreatment device from the amount of fuel consumed and the amount of oil consumed, and wherein the rate of sulfur adsorption is based on the capture rate value.

16. The exhaust gas treatment system as recited in claim 15, wherein the rate of sulfur adsorption is determined by the following equation:

$$dmS_{adsorbed}=d([S]_{Fuel}*FuelCons_{deSOx}+[S]_{Oil}*OilCons_{deSOx})*f_{CaptureRate}*f(temp,mS_{accumulated})_{adsorption}$$

where $dmS_{adsorbed}$ is the rate of sulfur adsorption, $[S]_{Fuel}$ is the sulfur exposure from fuel value, $FuelCons_{deSOx}$ is the amount of fuel consumed, $[S]_{Oil}$ is the sulfur exposure from oil value, $OilCons_{deSOx}$ is the amount of oil consumed, $f_{CaptureRate}$ is the capture rate value, and $f(temp, mS_{accumulated})_{adsorption}$ is a coefficient of sulfur adsorption that is based on the exhaust temperature value temp and the mass adsorbed value $mS_{accumulated}$.

17. The exhaust gas treatment system as recited in claim 12, wherein the total amount of sulfur stored is determined by the following equation:

$$dmS_{stored}=dmS_{adsorbed}-dmS_{desorbed}$$

where $dmS_{adsorbed}$ is the rate of sulfur adsorption, $dmS_{desorbed}$ is the rate of sulfur desorption, and $dmS_{stored}$ is the total amount of sulfur stored.

18. The exhaust gas treatment system as recited in claim 12, wherein the rate of sulfur desorption by at least one aftertreatment device is further based on a mass adsorbed value, wherein the exhaust temperature value represents a temperature profile of the at least one aftertreatment device and the mass adsorbed value represents a previous amount of sulfur that is already adsorbed by at least one aftertreatment device.

19. The exhaust gas treatment system as recited in claim 12, wherein the exhaust gas space velocity value is based on a flow rate of the exhaust gas and a volume of a catalyst.

20. The exhaust gas treatment system as recited in claim 12, wherein the at least one aftertreatment device is at least one of an oxidation catalyst ("OC") device and a selective catalytic reduction device ("SCR").

* * * * *